United States Patent Office 3,404,129
Patented Oct. 1, 1968

3,404,129
POTASSIUM CYANOZINCATE AS CATALYST IN THE PREPARATION OF POLYESTERS
William Peter Hoogendonk, Greenville, N.C., assignor to E. I. du Pont de Nemours and Company, Wilmington, Del., a corporation of Delaware
No Drawing. Filed Mar. 16, 1966, Ser. No. 534,645
6 Claims. (Cl. 260—75)

This invention relates to the manufacture of linear fiber-forming glycol-terephthalate polyesters from a glycol and an alkyl terephthalate, and more particularly to improvements in the ester-interchange reaction for preparing the glycol-terephthalate monomer of the polyester, when using a zinc salt ester-interchange catalyst.

The production of the novel class of film- and fiber-forming linear polyesters of terephthalic acid and a glycol of the series $HO(CH_2)_nOH$, wherein $n$ is an integer from 2–10, inclusive, is fully described in U.S. Patent No. 2,465,319 to Whinfield and Dickson. From a commercial standpoint, one of the most attractive polymers of this class is polyethylene terephthalate; and the most promising process for its production comprises carrying out an ester interchange between ethylene glycol and dimethyl terephthalate at temperatures within the range of 110° to 260° C. to form bis-2-hydroxyethyl terephthalate monomer which is polymerized to polyethylene terephthalate under reduced pressure and at elevated temperature.

It is known, for example, in Vodonik U.S. Patent No. 2,681,360, dated June 15, 1954, to use as the ester interchange catalyst, glycol-soluble zinc salts of mono-carboxylic acids to obtain the bis-hydroxyalkyl terephthalate by an ester interchange process followed by polycondensation using various well-known polycondensation catalysts, with or without the addition of phosphoric compounds in order to control the formation of color in the polymethylene terephthalate, as described, for example, in U.S. Patent No. 3,028,366 to Engle and Pohl. However, a commercial disadvantage of such compounds, particularly in continuous processes, is that they produce insoluble precipitates in the reaction vessels which reduce the efficiency of the reaction and may eventually lead to a premature shutdown of the continuous process. Such precipitates are found to consist primarily of zinc oxide.

The present invention avoids the above difficulty and also effectively accelerates the ester interchange reaction between a glycol, such as ethylene glycol, and a lower alkyl ester of terephthalic acid, such as dimethyl terephthalate, whereby to provide for efficient and economical continuous production of a linear polyester-forming bis-hydroxyalkyl terephthalate.

The process of the present invention, briefly stated, comprises reacting a glycol and a lower alkyl ester of terephthalic acid in the presence of catalytic amounts of a catalyst consisting of zinc salts complexed with nitrogen-containing compounds such as ammonium, amine, amide and cyanide salts. In particular, the use in the process of cyanides, especially potassium cyanide, is not only effective in preventing precipitation, but increases the catalytic activity of the ester interchange catalyst. While the addition of potassium cyanide is particularly effective in promoting the catalytic activity of zinc salts, it is advantageous to utilize commercially available potassium cyanozincate in order to avoid the necessity of handling the toxic potassium cyanide.

The invention will hereinafter be specifically described with respect to the preparation of bis-2-hydroxyethyl terephthalate monomer by an ester interchange reaction between ethylene glycol and dimethyl terephthalate, which process constitutes the preferred process embodiment of the invention. The invention, however, is applicable, in general, to the preparation of other glycol-terephthalate monomers by conducting an ester interchange between various other glycols of the series $HO(CH_2)_nOH$, where $n$ is an integer within the range 2–10, inclusive, and various other alkyl terephthalates, e.g., terephthalate esters of saturated aliphatic monohydric alcohols containing up to and including four carbon atoms, e.g., diethyl, dipropyl and diisobutyl terephthalates. Various specific glycols include trimethylene glycol, tetramethylene glycol, pentamethylene glycol, hexamethylene glycol, heptamethylene glycol, octamethylene glycol, etc.

In addition to akyl terephthalate polyesters, this invention is also useful in the processing of fiber-forming polyesters from other acids, as well as mixtures of terephthalic acid with other acids. Illustrative examples of other acids include adipic, sebacic, isophthalic, bibenzoic, hexahydroterephthalic, diphenoxyethane-4,4'-dicarboxylic, p,p'-carbonyldibenzoic, p,p'-sulfonyl-dibenzoic and naphthalene dicarboxylic-2,6. Fiber-forming synthetic linear polyesters may be prepared by reacting a glycol with the free acid, or mixture of acids, or with a reactive ester of the acid such as the dimethyl ester.

In general, based upon the weight of alkyl terephthalate (e.g., dimethyl terephthalate), concentrations of the metal cyanozincate complex between about 0.01% and about 0.2% are effective. The preferred range is between 0.02% and 0.15% of the weight of alkyl terephthalate present.

The catalyst of this invention may be incorporated or blended into the initial reaction mixture by any suitable expedient. Preferably, the catalysts are employed in finely-divided or powdered form and are dissolved directly in the reaction mixture. Alternatively, the catalysts may be dissolved conveniently in a dihydric alcohol, e.g., glycol, which in turn may be blended with the hot mixture of the glycol and dialkyl terephthalates.

The ester interchange reaction is carried out in known manner, for example, as described in U.S. Patent No. 2,681,360 to Vodonik, either batch-wise or in a continuous process. The catalyst complex is particularly adaptable to the continuous process for the ester interchange.

The following examples, wherein are set forth preferred embodiments, further illustrate the practice and principles of the invention. In Examples 1–3, the following procedure is employed with the results illustrated in the following Table 1.

EXAMPLES

Monomer preparation is carried out in four staged glass vessels, each vessel being provided with individual heat input, partial and total condensers, and overflows to the next vessel. Dimethyl terephthalate and ethylene glycol containing appropriate amounts of catalyst are continuously fed to the first stage, the temperature of which may be varied to control the rate of reaction. The data in Examples 1 through 3 pertain to a first-stage temperature of 180° C. Fractionation of the methanol formed and the glycol vapors is effected by partial condensers. The distilled methanol is condensed by total condensers. The amount of methanol is measured volumetrically at each stage, while the total monomer output is determined gravimetrically. Measurements are taken simultaneously at constant intervals. The color, expressed in a degree of yellowness by the "$b$" value, is measured colorimetrically on the monomer cake obtained.

TABLE 1.—SPECIFIC RATE CONSTANTS OF DIFFERENT CATALYST SYSTEMS

| Ex. No. | Catalyst system | Percent based on DMT | $k$-Value | "$b$" Value |
|---|---|---|---|---|
| 1 | Manganese ++ | 0.015 | 0.45 | 7.84 |
| 2 | Zinc ++ | 0.015 | 0.70 | 2.60 |
| 3 | Zinc ++ and Potassium Cyanide. | 0.015+0.1 | 2.3 | 2.47 |

Catalytic activities, k-value, expressed in specific rate constants, obtained for each catalyst under identical physical conditions, are calculated by the following procedure:

The glycol feed rate to the first stage of the apparatus described above is directly measured from a calibrated burette. The total methanol production (by weight) in the four stages is also known, and so is the monomer hydrazide), and oximes (e.g., dimethylglyoxime) can be added to the reaction mixture to prevent the formation of a zinc precipitate, but that their presence does not effect the catalytic activity of the zinc species. The color of monomer produced with these inhibitors may vary from white to cream. However, these inhibitors do not exhibit an enhancement of the catalytic activity of zinc species as does the addition of potassium cyanide. By themselves

TABLE 2.—EFFECT OF PRECIPITATION INHIBITORS ON ESTER EXCHANGE RATE

| Example No. | Inhibitor | Percent based on DMT | Temp. start of exchange (°C.) | Time to collect 84% of the theoretical amount of methanol | Monomer color |
|---|---|---|---|---|---|
| 4 | Control | | 147 | 32 | White. |
| 5 | Ammonium chloride | 0.011 | 150 | 43 | Slightly tinted. |
| 6 | Ethylenediamine | 0.018 | 132 | 32 | Tan. |
| 7 | Ethanolamine | 0.0102 | 133 | 33 | Cream. |
| 8 | Potassium cyanide | 0.083 | 130 | 28 | White. |
| 9 | Tris(hydroxymethyl) aminomethane | 0.056 | 142 | 32 | Do. |
| 10 | N-hydroxybenzenesulfonamide | 0.080 | 150 | 34 | Slightly tinted. |
| 11 | p-Toluenesulfonhydrazide | 0.086 | 140 | 34 | Light cream. |
| 12 | Dimethylglyoxime | 0.054 | 149 | 32 | Light brown. |
| 13 | Ethylene-diamine-tetra-acetic acid (Na Salt) | 0.090 | 148 | 54 | Tan. | production. Therefore, the dimethyl terephthalate feed rate to the first stage can be calculated. Since at least 50% of the reaction conversion takes place in the first stage, specific rate constants are calculated using data from the first stage only. The specific rate constant ($k$) is calculated as follows:

$$k = \frac{\text{rate}}{[DMT][2G]^{1/2}}$$

in which the rate is:

$$\frac{d[DMT]}{dt}$$

and

[DMT] = concentration of dimethyl terephthalate
[2G] = concentration of ethylene glycol.

The "$b$" value is determined according to the method of Glasser and reported in J. Op. Soc. Am., vol. 42, No. 9, pages 652–660, September 1956.

By comparison, in Example 2 using zinc acetate as the catalyst, the zinc recovery in the monomer prepared as described previously is in the range of 60–70%, as determined by X-ray fluorescence analyses indicating a loss by precipitation of 30–40% of the zinc injected. The addition of potassium cyanide in Example 3, or using potassium cyanozincate, directly, increases the recovery of zinc in monomer to over 90% under identical conditions. Use of zinc acetate as an ester exchange catalyst at the higher concentrations used for commercial operations results in formation and precipitation of insoluble zinc oxide in the reactor, and loss of catalyst markedly reduces the rate of ester interchange.

It will be evident from the foregoing description that the present invention provides a catalyst combination of high efficiency and enables the rapid and economic production of glycol terephthalates which have desirable characteristics, i.e., are substantially colorless.

In a single-stage ester interchange reaction, the rate of which is measured by the evolution of methanol as a function of time, the following examples demonstrate that certain amines (e.g., ethanolamine, ethylenediamine, tris (hydroxy methyl) aminomethane), amides (e.g., N-hydroxybenzenesulfonamide), azides (e.g., p-toluenesulfon- all of these inhibitors are ineffective catalysts. The results of Examples 4–13 are shown in Table 2.

Since it is apparent that various changes may be made in the manner of details without departing from the broad spirit and scope of the invention, it is to be understood that the invention is in no way restricted except as set forth in the appended claims.

I claim:
1. In the process for producing linear fiber-forming glycol-terephthalate polyesters from a glycol of the formula $HO(CH_2)_nOH$, where $n$ is an integer from 2 to 10, and an alkyl terephthalate having 1 to 4 carbon atoms in the alkyl group, using an ester-interchange reaction followed by polymerization to form the polyester, the improvement which comprises carrying out the ester-interchange reaction in the presence of a catalytic amount of potassium-cyanozincate as a catalyst.

2. A process as defined in claim 1 wherein the amount of said potassium cyanozincate is between 0.02% and 0.15% by weight of the alkyl terephthalate present.

3. A process as defined in claim 1 wherein finely-divided potassium cyanozincate is dissolved in the ester-interchange reaction mixture.

4. A process as defined in claim 1 wherein zinc acetate and potassium cyanide are dissolved in the reaction mixture to form said potassium cyanozincate catalyst for the ester-interchange reaction.

5. A process as defined in claim 1 wherein ethylene glycol and dimethyl terephthalate are heated at temperatures within the range of 110° to 260° C. in the presence of potassium cyanozincate ester-interchange catalyst to form bis-2-hydroxyethyl terephthalate monomer for polymerization to polyethylene terephthalate.

6. A process as defined in claim 5 wherein the process is carried out as a continuous operation with continuous addition of ethylene glycol, dimethyl terephthalate and catalyst to a reaction zone and with removal of the reaction products from the zone.

References Cited

UNITED STATES PATENTS 3,228,913  1/1966  Nesty et al. ———————— 260—75

WILLIAM H. SHORT, *Primary Examiner.*

LOUISE P. QUAST, *Assistant Examiner.*